Feb. 2, 1926.　　　　　　　　　　　　　　　　　　1,571,332
L. W. HERMINGHAUSEN
FISHING TOOL
Filed Feb. 21, 1925　　　2 Sheets-Sheet 2
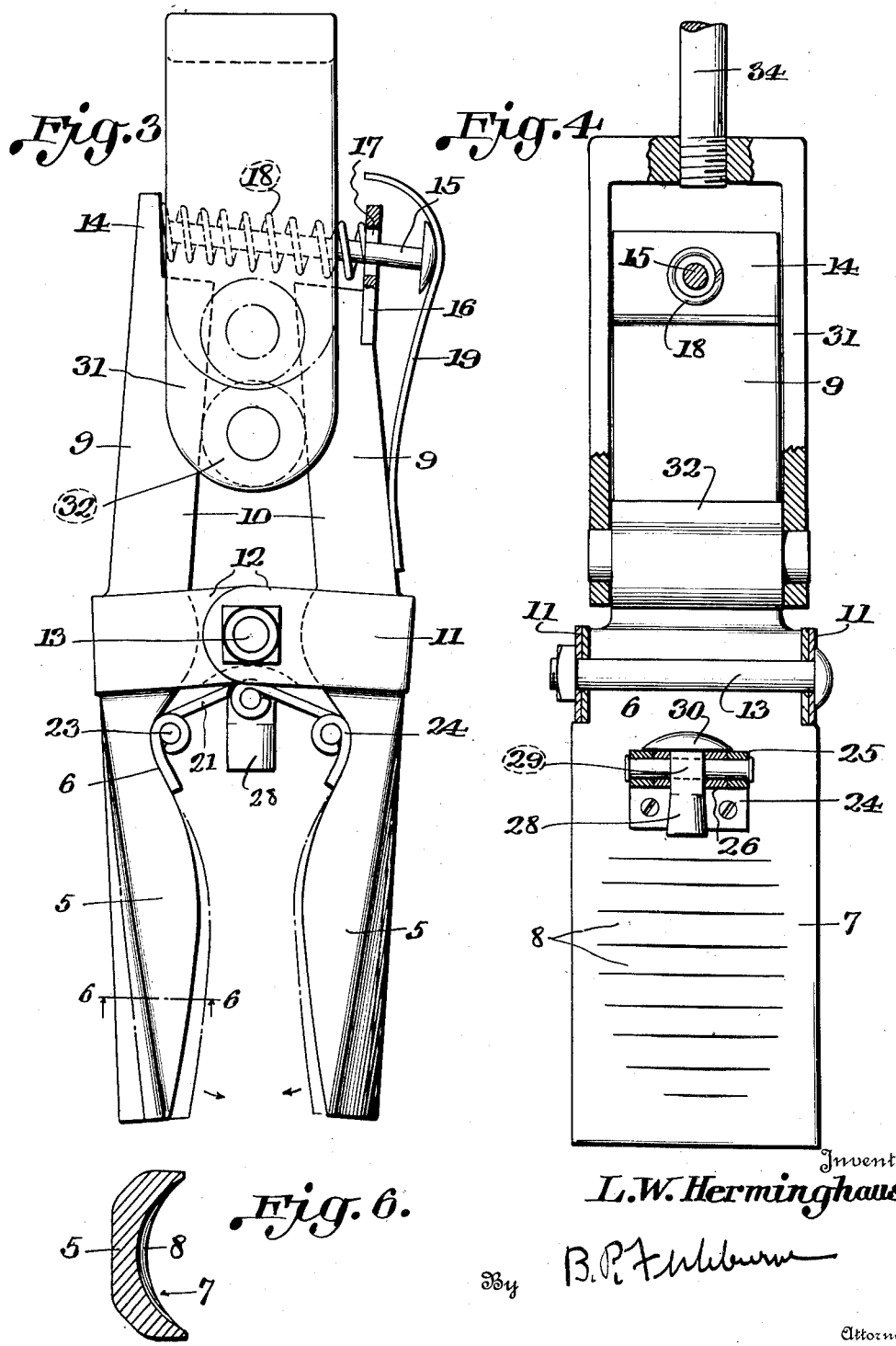
Inventor
L. W. Herminghausen
By B. P. Fulbright
Attorney Patented Feb. 2, 1926.

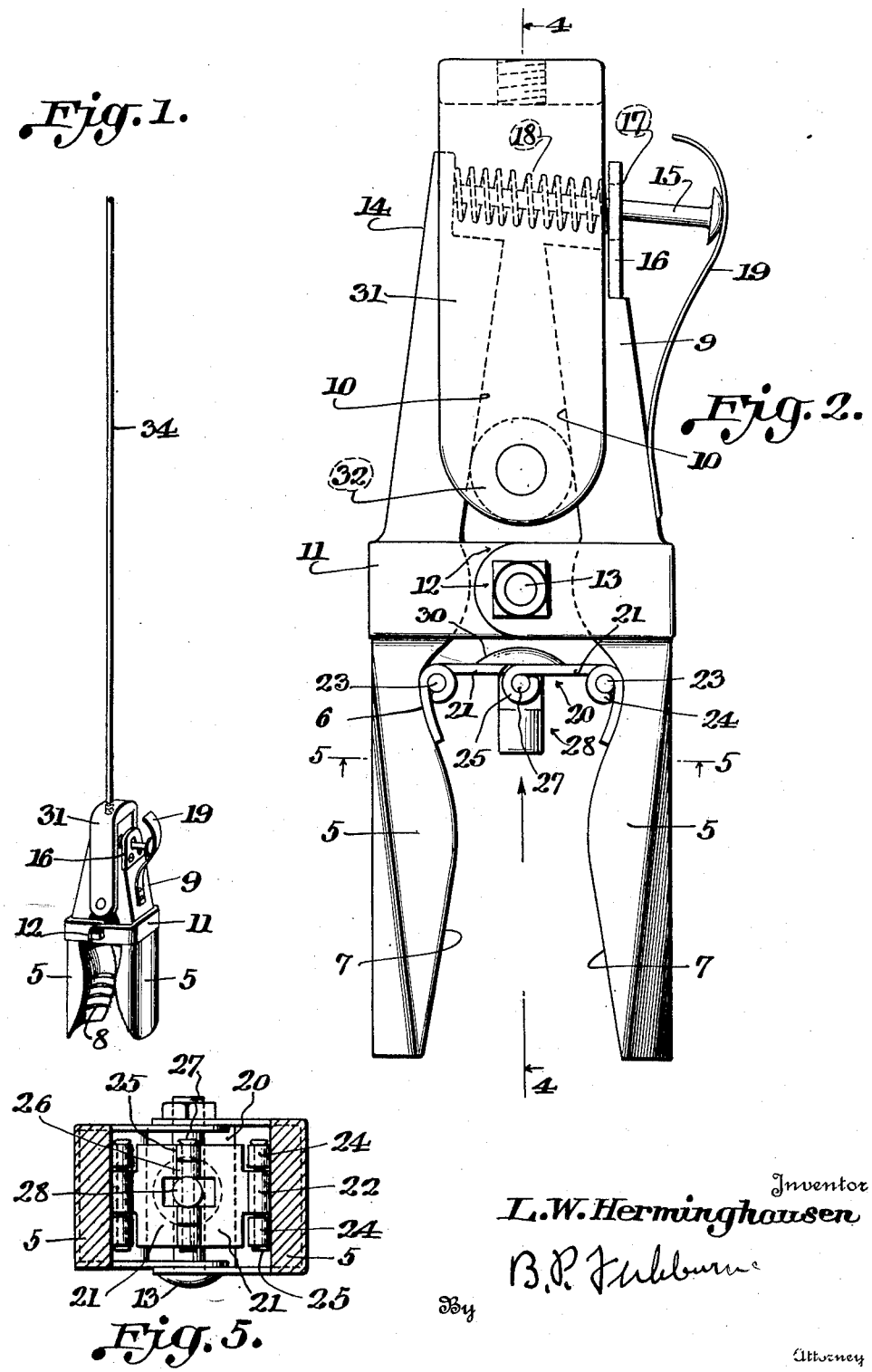

1,571,332

UNITED STATES PATENT OFFICE.

LOUIS W. HERMINGHAUSEN, OF MENDON, MISSOURI, ASSIGNOR OF ONE-HALF TO JAMES H. STAPLES, OF SHAWNEE, OKLAHOMA.

FISHING TOOL.

Application filed February 21, 1925. Serial No. 10,817.

*To all whom it may concern:*

Be it known that I, LOUIS W. HERMINGHAUSEN, a citizen of the United States, residing at Mendon, in the county of Chariton and State of Missouri, have invented certain new and useful Improvements in Fishing Tools, of which the following is a specification.

My invention relates to a fishing tool for use in oil wells, for removing obstructions therein, such as tools, rods, cables, wires, slush buckets, tubing, etc.

An important object of the invention is to provide a device of the above mentioned character having means whereby the jaws may be held in the open position, and be suddenly tripped to engage with the object to be raised, and upon the raising of the tool, such jaws will have positive clamping engagement with the object.

A further object of the invention is to provide a fishing tool of the above mentioned character, which is simple in construction, strong and durable.

Other objects and advantages of the invention will be apparent during the course of the following description.

In the accompanying drawings, forming a part of this specification and in which like numerals are employed to designate like parts throughout the same, Figure 1 is a perspective view of a fishing tool embodying my invention, showing the same in use, Figure 2 is a side elevation of the device, with the jaws locked in the open position, Figure 3 is a similar view, with the jaws in the closed position, Figure 4 is a transverse section taken on line 4—4 of Figure 2.

Figure 5 is a transverse horizontal section taken on line 5—5 of Figure 2, and,

Figure 6 is a detailed section taken on line 6—6 of Figure 2.

In the drawings, wherein for the purpose of illustration is shown a preferred embodiment of my invention the numeral 5 designates a pair of jaws, formed of any suitable metal. These jaws have upper recesses 6, which are longitudinally curved but flat in cross section and lower recesses 7, which are longitudinally straight and diverge downwardly and are transversely curved. The curved recesses 7 are serrated, as indicated at 8. The precise shape and construction of the jaws may vary somewhat depending upon the character of the object to be removed from the well. The construction of the present jaws is designed to remove a bit from the well. In removing rods, tubing or the like, the jaws may have a more pronounced curvature, at their inner faces. Formed integral with the upper ends of the jaws 5 are arms 9, projecting above the same. These arms converge upwardly and have inclined upwardly converging cam faces 10.

The jaws 5 are provided at their upper ends with U-shaped pivot members 11 rigidly secured thereto, facing inwardly and having transverse arms 12, which function as knuckles. These pairs of arms 12 are pivotally connected by a bolt 13 or the like. One arm 9 is provided at its top with a reduced extension 14, carrying a transverse bolt 15, rigidly secured thereto. The other arm 9 terminates beneath this bolt and carries a plate 16 having an elongated slot 17, receiving the bolt 15. The plate is rigidly attached to the upper end of the adjacent arm 9. A compressible coil spring 18 is confined between the extension 14 and plate 16, and serves to spread the arms 9, as shown. The head of the bolt 15 engages the inner side of a curved leaf spring 19, attached to the lower end of the adjacent arm 9, as shown.

Means are provided to lock the jaws 5 in the open position, embodying a toggle joint 20. This toggle joint includes a pair of leaves 21. The outer ends of these leaves carry knuckles 22, pivotally receiving pins 23, held within knuckles 24, suitably rigidly secured to the jaws 5, within the recesses 6. The inner ends of the leaves 21 carry knuckles 25 and 26, pivotally receiving a pin 27. The inner knuckles 26 are spaced for providing an opening and within this opening is mounted a trip element 28, having a transverse opening 29, pivotally receiving the pin 27. The lower end of this trip element projects downwardly beyond the leaves 21, for a substantial distance, as shown. The trip element 28 is provided at its top with a head 30, integral therewith, and this head contacts with the upper faces of the leaves 21, when these leaves are shifted to the lowermost position, and serves as a stop to limit the downward movement of the leaves. When in the lowermost position, the pin 27 has its center slightly below the center of the pins 23, and hence the leaves 21 are locked in the outer or expanded position. When the object to be raised contacts with the trip element 28, it shifts the leaves 21 upwardly with respect to the jaws, thus breaking the toggle, whereby the spring 18 will instantly throw the jaws into engagement with the object to be raised.

The numeral 31 designates a yoke, which straddles the edges of the arms 9, and is disposed at a right angle to the jaws 5. This yoke carries an expanding roller 32, within its lower end, which is pivotally connected with the sides of the yoke, as shown. This expanding roller is arranged to engage the inclined cam faces 10 of the arms 9. The yoke 31 is adapted for connection with a drill stem 34, as shown.

The operation of the fishing tool is as follows:

The jaws 5 are shifted to the outer position, Figure 2, and the toggle joint 20 is expanded so that the leaves 21 thereof are locked in the approximately horizontal position. The device may then be lowered into the well by means of a cable 34 or the like. When the object to be raised passes between the jaws 5, such object may contact with the trip element 28 or the leaves 21 adjacent to the trip element, and the toggle is broken, the leaves 21 moving upwardly. The spring 18 will now quickly throw the jaws into engagement with the object to be raised. When the cable 34 is elevated, the jaws 5 tending to remain in engagement with the object, the yoke 31 will be elevated slightly with respect to the arms 9. The expanding roller 32 will travel upwardly along the inclined cam faces 10, and the jaws 5 will be positively brought into clamping engagement with the object to be raised. It is thus seen that the fishing tool may then be elevated and will carry the object with it.

It is to be understood that the form of my invention herewith shown and described is to be taken as a preferred embodiment of the same, and that various changes in the shape, size, and arrangement of parts may be resorted to without departing from the spirit of my invention or the scope of the subjoined claims.

Having thus described my invention, I claim:

1. A fishing tool of the character described, comprising a pair of jaws carrying upwardly extending arms provided upon their inner faces with longitudinally extending cam faces, means pivotally connecting said jaws adjacent to the lower ends of the arms, a toggle trip arranged between the jaws and connected therewith, a spring for spreading said arms, a yoke straddling the arms, and a spreading element mounted within the yoke and arranged between the arms to engage the cam faces, the leverage of the device increasing as the spreading element moves upwardly upon said cam faces and away from said jaws.

2. A fishing tool of the character described, comprising a pair of jaws, means pivotally connecting the jaws, a toggle trip arranged between the jaws embodying a pair of leaves having their outer ends hinged to the jaws, a pivot element connecting the inner ends of the leaves, and a bolt having a transverse opening to receive said pivot element and provided at its upper end with a head which engages the upper faces of the leaves to limit their downward movement.

3. A fishing tool of the character described, comprising a pair of levers which are pivotally connected between their ends, said levers embodying jaws and arms carried by the jaws, one arm being provided upon its inner side with a cam face which is inclined inwardly toward the upper end of the arm when the jaws are in the open position, upwardly breaking trip means arranged between the jaws to hold the jaws in the open position, a spring to quickly move the jaws toward each other when released by the upwardly breaking trip means, and a suspension element movable longitudinally with relation to the arms and having a part arranged between the arms and engaging with the cam face, the leverage of the device increasing as the suspension element moves upwardly from said jaws.

In testimony whereof I affix my signature.

LOUIS W. HERMINGHAUSEN.